(12) United States Patent
Hooper et al.

(10) Patent No.: US 7,356,778 B2
(45) Date of Patent: Apr. 8, 2008

(54) METHOD AND SYSTEM FOR VISUALIZATION AND OPERATION OF MULTIPLE CONTENT FILTERS

(75) Inventors: David Sheldon Hooper, Victoria (CA); Yida Mao, Victoria (CA); Matthew Stanlake, Victoria (CA)

(73) Assignee: ACD Systems Ltd., Victoria (CA)

( * ) Notice: Subject to any disclaimer, the term of this patent is extended or adjusted under 35 U.S.C. 154(b) by 594 days.

(21) Appl. No.: 10/671,024

(22) Filed: Sep. 24, 2003

(65) Prior Publication Data

US 2005/0044100 A1 Feb. 24, 2005

Related U.S. Application Data

(63) Continuation-in-part of application No. 10/645,260, filed on Aug. 20, 2003.

(51) Int. Cl.
G06F 3/00 (2006.01)
(52) U.S. Cl. ............... 715/841; 715/968; 715/764; 715/853; 715/810; 707/100; 707/102
(58) Field of Classification Search ............. 715/500.1, 715/764, 810, 963, 853, 968; 345/777; 348/207.99; 707/2, 102, 100; 705/8
See application file for complete search history.

(56) References Cited

U.S. PATENT DOCUMENTS

| 2003/0033296 A1* | 2/2003 | Rothmuller et al. ........... 707/3 |
|---|---|---|
| 2003/0039408 A1* | 2/2003 | Smith ........................ 382/298 |
| 2004/0027931 A1* | 2/2004 | Morita ..................... 369/30.09 |
| 2004/0189707 A1* | 9/2004 | Moore et al. ................ 345/777 |
| 2004/0267700 A1* | 12/2004 | Dumais et al. ................. 707/2 |
| 2005/0160113 A1* | 7/2005 | Sipusic et al. ........... 707/104.1 |
| 2006/0077461 A1* | 4/2006 | Camara et al. ............ 358/1.15 |
| 2006/0161867 A1* | 7/2006 | Drucker et al. ............. 715/810 |

OTHER PUBLICATIONS

Graham et al. "Time as Essence for Photo Browsing Through Personal Digital Libraries", Jul. 13-17, 2002, pp. 326-335.*
hppt://fototime.com/ftweb/fahelp/210.htm , 138.htm , 212.htm; published on Jul. 27, 2003.*

* cited by examiner

*Primary Examiner*—Weilun Lo
*Assistant Examiner*—TuyetLien Tran
(74) *Attorney, Agent, or Firm*—Blakely, Sokoloff, Taylor & Zafman LLP (57) ABSTRACT

A system for operation and visualization of multiple content filters, including a plurality of filter interfaces for setting parameters of corresponding content filters that filter a catalog of assets, each content filter having a lock status being in a locked or an unlocked state, and each filter interface having a display generator for rendering a user interface display, wherein at least one such user interface display for a content filter is dependent upon the lock status of another content filter, and a lock processor for setting the lock status of at least one content filter. A method and a computer readable storage medium are also described and claimed.

15 Claims, 7 Drawing Sheets

METHOD AND SYSTEM FOR VISUALIZATION AND OPERATION OF MULTIPLE CONTENT FILTERS

CROSS REFERENCE TO RELATED APPLICATIONS

This application is a continuation-in-part of assignee's pending application U.S. Ser. No. 10/645,260, filed on Aug. 20, 2003, entitled "Method and System for Calendar Based Image Asset Organization."

FIELD OF THE INVENTION

The present invention relates to organization of content, and in particular to use of multiple filters therefor.

BACKGROUND OF THE INVENTION

With today's growth and advances in image capture devices, digital images are proliferating at a rate nearly equal to that of traditional film-based photographs. Digital scanners and digital still and video cameras with mega-pixel resolutions are becoming more and more affordable, and producing higher and higher quality images.

Conventional film-based photographs and video reels have often been organized and saved in numerous photo albums and "shoe boxes". As users of digital capture devices accumulate numbers of images into the thousands, organization of their images becomes nearly intractable. Specifically, retrieval of desired images becomes very cumbersome and time consuming.

In order to be able to efficiently retrieve and access their digital images using prior art hardware and software, users are typically required to manually classify images in terms of categories and sub-categories, or by key words or captions, or to manually save them within appropriate file folders and sub-folders. If a user's selection of categories and sub-categories, or folders and sub-folders is not carefully planned, search and retrieval of desired images will be overly time-consuming, and the user may have to re-classify his entire archive of images. Consider, for example, although e-mail can be custom organized into folders and sub-folders, how time consuming it typically is for a user to locate a specific e-mail he received a year ago, within the thousands of e-mails he receives per year; even more so with digital images, which are intended to be preserved for generations.

Thus a major concern of users of digital images today is efficient archival and retrieval, for large image archives over long time spans.

SUMMARY OF THE INVENTION

The present invention provides a method and system for organizing digital images in an automatic and transparent way, without requiring manual work on the part of a user. In applicant's co-pending application U.S. Ser. No. 10/645, 260, filed on Aug. 20, 2003 and entitled "Method and System for Calendar Based Image Asset Organization", it is described how images can be automatically organized by date and efficiently accessed with a calendar type user interface. Accessing images by one or more date ranges corresponds to a particular type of filter.

More generally, a user may wish to access images using a plurality of filters, each filter having different characteristic parameters; for example, a calendar based filter, a folder based filter and a category based filter. Thus a user may wish to view those of his images that were taken in September 2003, within a folder named "My Pictures" and being categorized under "Family". Or, somewhat more complex, the user may wish to view those of his images taken in August 2001, August 2002 or August 2003, within a folder named "My Pictures" or a folder named "Archive", and being categorized under both "Family" and "Places".

The present invention preferably includes a simple graphical user interface for displaying a plurality of filters, for interactively setting characteristic parameters of the filters, and for interactively activating all or an arbitrary subset of the filters.

There is thus provided in accordance with a preferred embodiment of the present invention a system for operation and visualization of multiple content filters, including a plurality of interfaces for content filters that filter a catalog of assets, each interface including at least one control for setting at least one content filter parameter, a filter activation interface for activating at least one of the content filters, and a display interface for viewing a result of application of the activated content filters to the catalog of assets.

There is further provided in accordance with a preferred embodiment of the present invention a method for operation and visualization of multiple content filters, including providing a plurality of interfaces for content filters that filter a catalog of assets, each interface including at least one control for setting at least one content filter parameter, activating at least one of the content filters, and displaying a result of application of the activated content filters to the catalog of assets.

There is yet further provided in accordance with a preferred embodiment of the present invention a computer-readable storage medium storing program code for causing a computer to perform the steps of providing a plurality of interfaces for content filters that filter a catalog of assets, each interface including at least one control for setting at least one content filter parameter, activating at least one of the content filters, and displaying a result of application of the activated content filters to the catalog of assets.

There is moreover provided in accordance with a preferred embodiment of the present invention a system for retrieval of digital assets having metadata associated therewith, including an interface for generating a plurality of metadata constraints, and for activating at least one generated metadata constraint, a query processor for applying the activated metadata constraints, and a display interface for viewing a result of the query processor.

There is additionally provided in accordance with a preferred embodiment of the present invention a method for retrieving digital assets having metadata associated therewith, including generating a plurality of metadata constraints, activating at least one generated metadata constraint, applying the activated metadata constraints, and viewing a result of the applying.

There is further provided in accordance with a preferred embodiment of the present invention a computer-readable storage medium storing program code for causing a computer to perform the steps of generating a plurality of metadata constraints, activating at least one generated metadata constraint, applying the activated metadata constraints, and viewing a result of the applying.

There is yet further provided in accordance with a preferred embodiment of the present invention a system for operation and visualization of multiple content filters, including a plurality of filter interfaces for setting parameters of corresponding content filters that filter a catalog of assets, each content filter having a lock status being in a locked or an unlocked state, and each filter interface having a display generator for rendering a user interface display, wherein at least one such user interface display for a content filter is dependent upon the lock status of another content filter, and a lock processor for setting the lock status of at least one content filter.

There is moreover provided in accordance with a preferred embodiment of the present invention a method for operation and visualization of multiple content filters, including providing a plurality of filter interfaces for setting parameters of corresponding content filters that filter a catalog of assets, each content filter having a lock status being in a locked or an unlocked state, setting the lock status of at least one content filter, and rendering a user interface display for a content filter, that is dependent upon the lock status of another content filter.

There is additionally provided in accordance with a preferred embodiment of the present invention a computer-readable storage medium storing program code for causing a computer to perform the steps of providing a plurality of filter interfaces for setting parameters of corresponding content filters that filter a catalog of assets, each content filter having a lock status being in a locked or an unlocked state, setting the lock status of at least one content filter, and rendering a user interface display for a content filter, that is dependent upon the lock status of another content filter.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention overcomes limitations of prior art image organization software and hardware, which require considerable manual user effort to organize large image archives by classification in terms of category and sub-category, or in terms of captions, or in terms of key words. The present invention provides a method and system for automatic organization of image assets for efficient retrieval and access.

User Interface

Figure 1A:
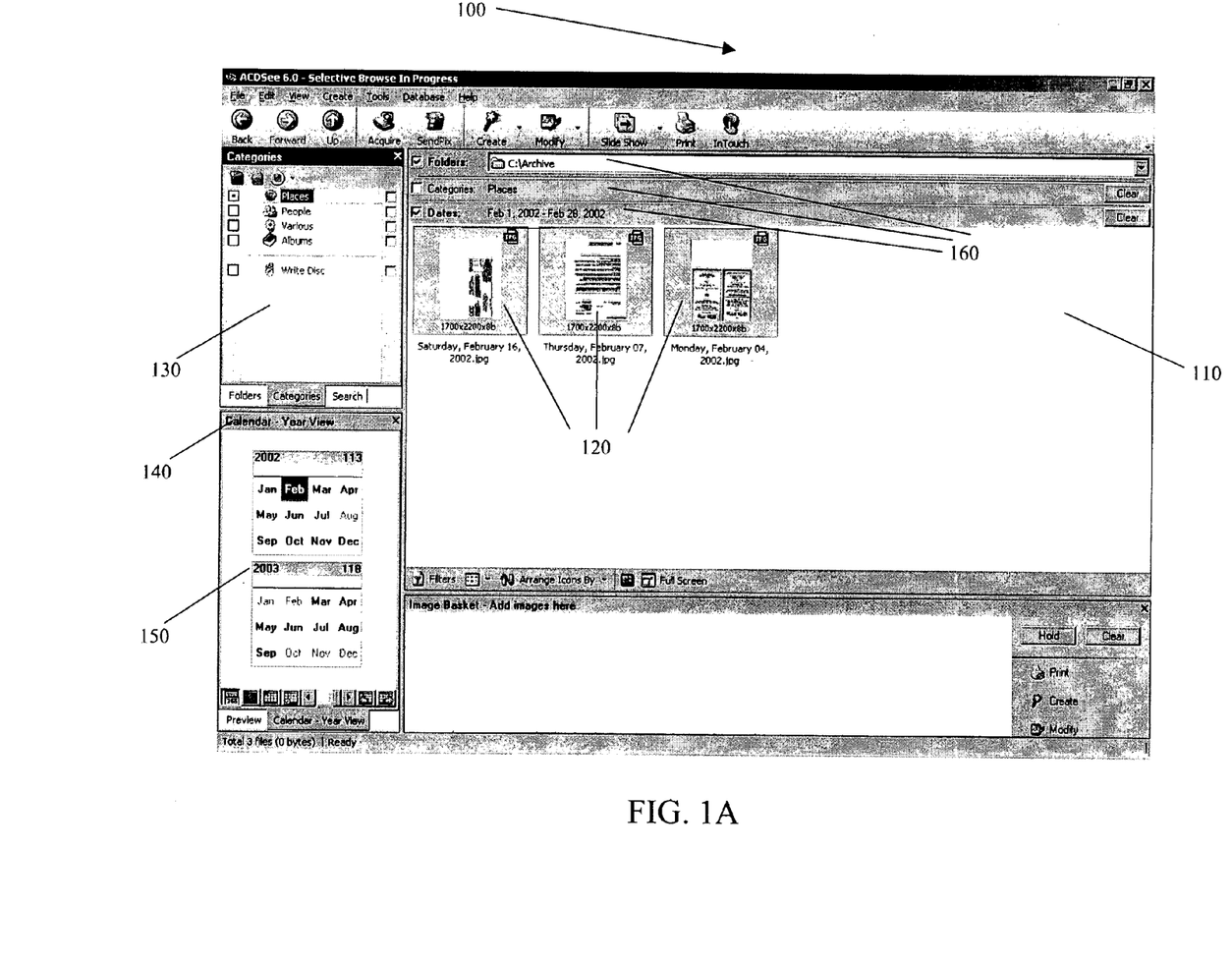
FIGS. 1A and 1B are illustrations of a specific user interface for setting characteristic parameters of a plurality of filters and for activating all or a subset of the filters, in accordance with a preferred embodiment of the present invention.
Figure 1B:
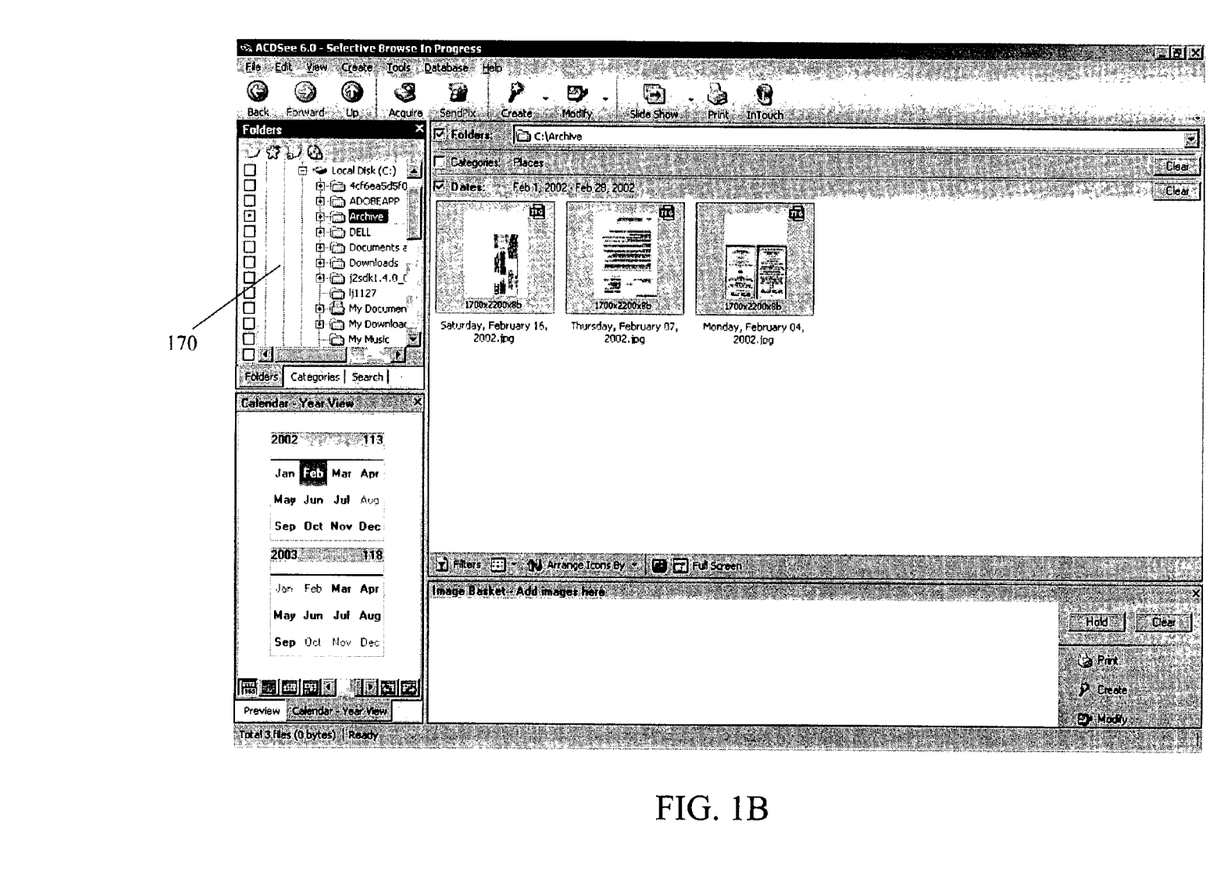

Reference is now made to FIGS. 1A and 1B, which are illustrations of a specific user interface for setting characteristic parameters of a plurality of filters and for activating all or a subset of the filters, in accordance with a preferred embodiment of the present invention. Shown in FIG. 1A is a window 100 including a pane 110 in which are displayed thumbnail versions 120 of digital images. Selection of which images thumbnails 120 to display within pane 110 is derived from a plurality of filters. Window 100 includes a pane 130 for interactively setting a category based filter, and a pane for interactively setting a folder based filter, accessible by tab 140 and shown in FIG. 1B, and a pane 150 for interactively setting a calendar based folder.

The category based filter displayed in pane 130 is preferably set by checking one or more of the boxes appearing to the left of the list of categories. For example, FIG. 1 shows that a category named "Places" is checked. In a preferred embodiment of the present invention, pane 130 also enables categories to be assigned to individual images or groups of images. Specifically, if one or more image thumbnails 120 displayed in pane 110 are selected, then the selected images can be assigned one or more categories by clicking on boxes appearing to the right of the list of categories.

A pane for the folder based filter is accessed by clicking on tab 140. Preferably, as shown in FIG. 1B, the folder based filter enables a user to select one or more folders, by checking one or more boxes appearing to the left of the list of folders.

The date based filter displayed in pane 150 is preferably set by selecting one or more date ranges within a yearly calendar display or a monthly calendar display or a daily calendar display. The yearly, monthly and daily calendar displays are preferably alternated by clicking on buttons at the bottom of pane 150. Detailed description of calendar based filters is provided in applicant's co-pending application U.S. Ser. No. 10/645,260, filed on Aug. 20, 2003 and entitled "Method and System for Calendar Based Image Asset Organization".

A list 160 of filters that have been set, including their parameters, is preferably displayed above pane 110. List 160 includes checkboxes for activating all or a subset of the filters. For example, FIG. 1 shows that (i) the folder based filter is set to filter images based on a folder named C:\Archive and is activated; (ii) the category based filter is set to filter images based on a category named "Places", but is not activated; and (iii) the date based filter is set to filter images based on a date range Feb. 1, 2002-Feb. 28, 2002 and is activated. Thus the images whose thumbnails 120 are displayed in pane 110 are those images within folder C:\Archive that are dated in February 2002. The category based filter is not activated, and thus the filtered images have no category restriction.

Preferably, display of filtered images within pane 110 is performed interactively, and is updated whenever a filter setting or activation state is changed. Thus, referring to FIG. 1, if a user un-checks the check box for the folder based filter, then pane 110 is immediately updated to include thumbnails of images dated in February 2002, irrespective of which folder they reside in. Similarly, if the check box for the folder based filter remains checked and the user changes the filter settings to a different folder, than pane 110 is immediately updated to include thumbnails of images dated in February 2002 and residing in the different folder.

It may thus be appreciated that the user interface illustrated in FIG. 1 provides flexibility in setting and activating a plurality of filters, each filter having its own unique characteristics. By checking and un-checking the boxes in list 160, eight possible combinations of filters can be instantly activated.

It may also be appreciated that the user interface illustrated in FIG. 1 applies to a diversity of assets, including inter alia image files, video files, audio files, document files and even folders—which are also a type of asset.

Figure 2:
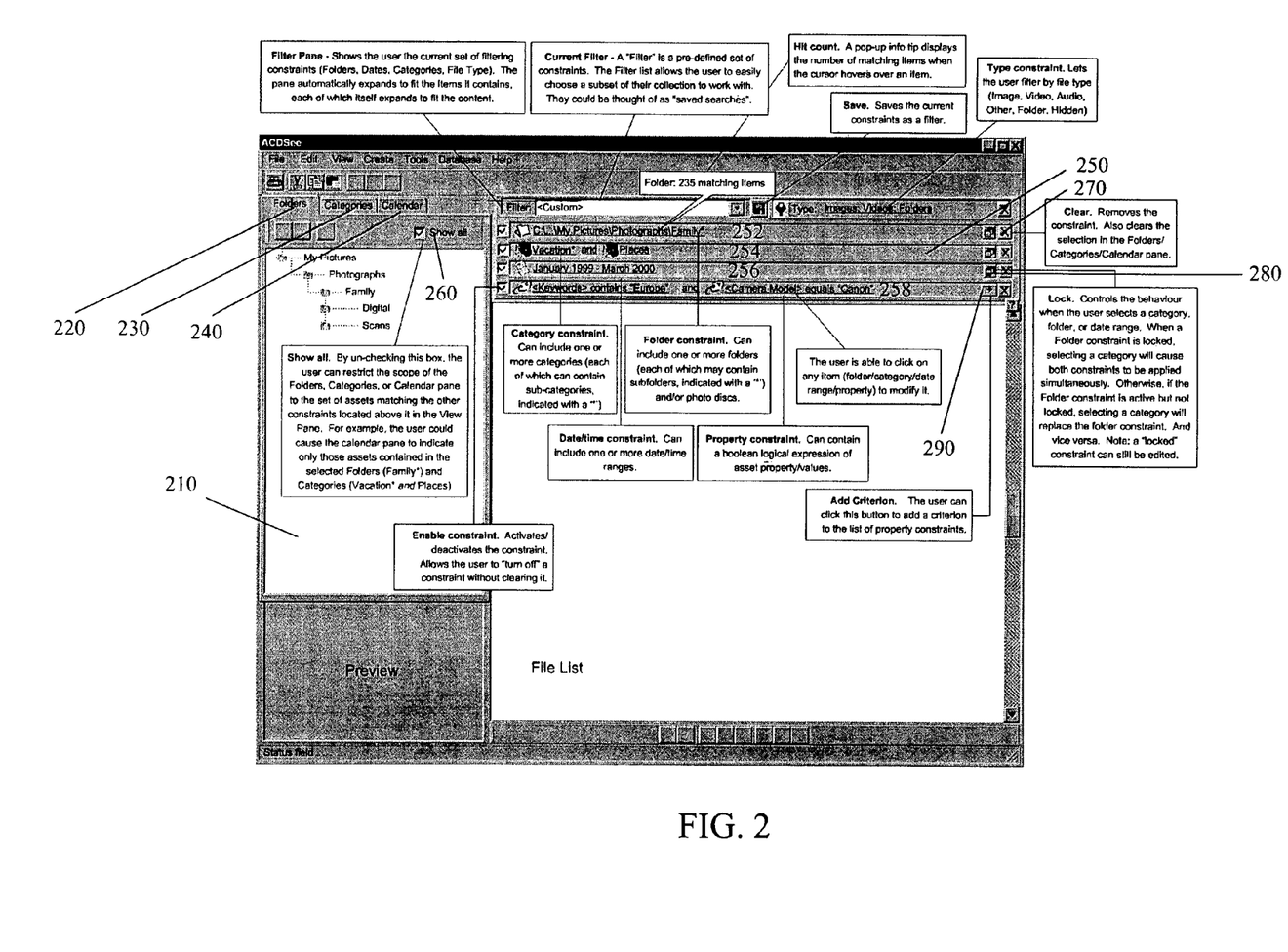
FIG. 2 is an illustration of a user interface having more functionality than that of FIG. 1, in accordance with a preferred embodiment of the present invention.

Reference is now made to FIG. 2, which is an illustration of a user interface having more functionality than that of FIG. 1, in accordance with a preferred embodiment of the present invention. In the environment of FIG. 2, the concept of a filter is broadened to include a general set of metadata constraints. Thus a filter is analogous to a general database query. "Metadata" is a general term referring to auxiliary data that provides descriptive information associated with binary content data. Metadata includes inter alia file system descriptive data, such as file name, last modified date & time, and file folder location. Metadata also includes inter alia capture device descriptive data, such as camera or scanner model, camera or scanner settings, capture date & time, and capture location such as global positioning system (GPS) location data. Metadata also includes inter alia user assigned properties, such as key words, categories and owner name.

Shown in FIG. 2 is a pane 210 containing tabs 220, 230 and 240 for accessing corresponding filters. Preferably, tab 220 is used to access a folder based filter pane, as shown in FIG. 2. Tab 230 is used to access a category based filter pane (not shown), and tab 240 is used to access a calendar based filter pane (not shown). In the general setting of FIG. 2, categories are preferably organized hierarchically, a category containing zero or more sub-categories, analogous to the way folders are organized.

A filter pane 250 preferably includes a list of filters that have been set, with checkboxes for selectively activating all or a subset of the listed filters. A folder based filter is indicated by numeral 252, a category based filter is indicated by numeral 254, a date & time based filter is indicated by numeral 256, and a property constraint filter is indicated by numeral 258. Preferably, a property filter enables setting a Boolean logical expression of image asset property values. Preferably, each filter in the list is represented by a characteristic icon, as shown in FIG. 2.

As shown in FIG. 2, the folder based filter constrains the assets to those residing in the folder My Pictures\Photographs\Family; the category based filter constrains the assets to those belonging to both categories "Vacation*" and "Places"; the date & time based filter constrains the assets to those dated between January 1999 and March 2000; and the property filter constrains the assets to those with keywords including the word "Europe" and with camera model being Canon. Preferably the asterisk, as used with the "Vacation*" category, indicates any sub-categories of category "Vacation"; i.e., assets categorized under "Vacation" or under any sub-category thereof. All four of these filters are shown activated, and the asset types being filtered include images, videos and folders.

Also shown in FIG. 2 are (i) a "Show All" checkbox 260 for restricting the scope of filters; (ii) a "Clear" button 270 for clearing filters; (iii) "Lock" buttons 280 for preserving activation status of a filter when another filter is changed; and (iv) an "Add" button 290 for adding a constraint to the property filter. Other features of the user interface are described in annotations included in FIG. 2.

A particular feature of the present invention is the ability to control which filters are applied within the individual filter panes themselves, by use of the "Show All" checkbox 260 or the "Lock" buttons 280. Suppose, for example, a user is setting folder, category and calendar filters as shown in FIG. 2. The folder filter has been set to filter assets belonging to the folder C:\\My Pictures\Photographs\Family, and the categories filter has been set to filter assets categorized both under "Vacation" or any of its sub-categories, and under "Places". The user proceeds to the calendar pane to set the calendar filter.

Preferably, each filter pane has a "Show All" checkbox 260. Within the calendar pane, if the "Show All" checkbox is un-checked, then the calendar pane operates only on those assets filtered by the folder and category filters. Specifically, the calendar pane operates only on those assets belonging to the folder C:\\My Pictures\Photographs\Family, and being categorized under "Vacation" or any of its sub-categories, and also under "Places". The statistics as to numbers of assets in the catalog within a given year, as shown in FIG. 1A; i.e., 113 images in 2002 and 118 images in 2003, or within a given month or date, are based only on those assets filtered by folder and category. On the other hand, if the "Show All" checkbox is checked, then the calendar pane operates on all assets in the catalog, and the statistics are based on all assets.

In general, when applying multiple filters, say, filter A, filter B and filter C, although the result of applying all three filters does not depend on the order of the filters, the intermediate results do. A user having set filter A and while working on filter B within a filter B user interface pane, can choose (i) to view all assets, in which case he unlocks filter A; or (ii) to view only those assets filtered by filter A, in which case he locks filter A. Similarly, after having set filters A and B and while working on filter C within a filter C user interface pane, the user can choose (i) to view all assets, in which case he unlocks both filter A and filter B; or (ii) to view only those assets filtered by filter A, in which case he locks filter A and unlocks filter B; or (iii) to view only those assets filtered by filter B, in which case he locks filter B and unlocks filter A; or (iv) to view only those assets filtered by both filters A and B, in which case he locks both filters A and B.

When a user sets filters sequentially, the "Show All" checkbox is preferably used to lock or unlock previously set filters, while the user is setting a current filter.

It may thus be appreciated that the present invention provides a user interface having the following advantages:

Intuitive and easy to use.

Presents a minimal amount of interface "clutter".

Uses a minimal amount of screen "real estate".

Ties together the actions of folders, categories and calendar panes.

Summarizes for a user which subset of his assets are currently displayed; namely, the filtering constraints.

Enables a user to define and quickly switch between filters.

Enables a user to interactively generate and "lock on" to one or more constraints, thus activating a temporary "view" of the image collection.

Enables a user to incrementally and interactively build compound search queries.

Implementation Details

In a preferred embodiment of the present invention, one or more relational database tables are used to store and retrieve metadata for image assets and other types of assets. It may be appreciated by those skilled in the art that other data structures may be used in alternative embodiments of the present invention. For example, image metadata may be stored in a tree data structure, or in a linked list, or in a dynamic array; i.e., an array that can expand and shrink.

Figure 3:
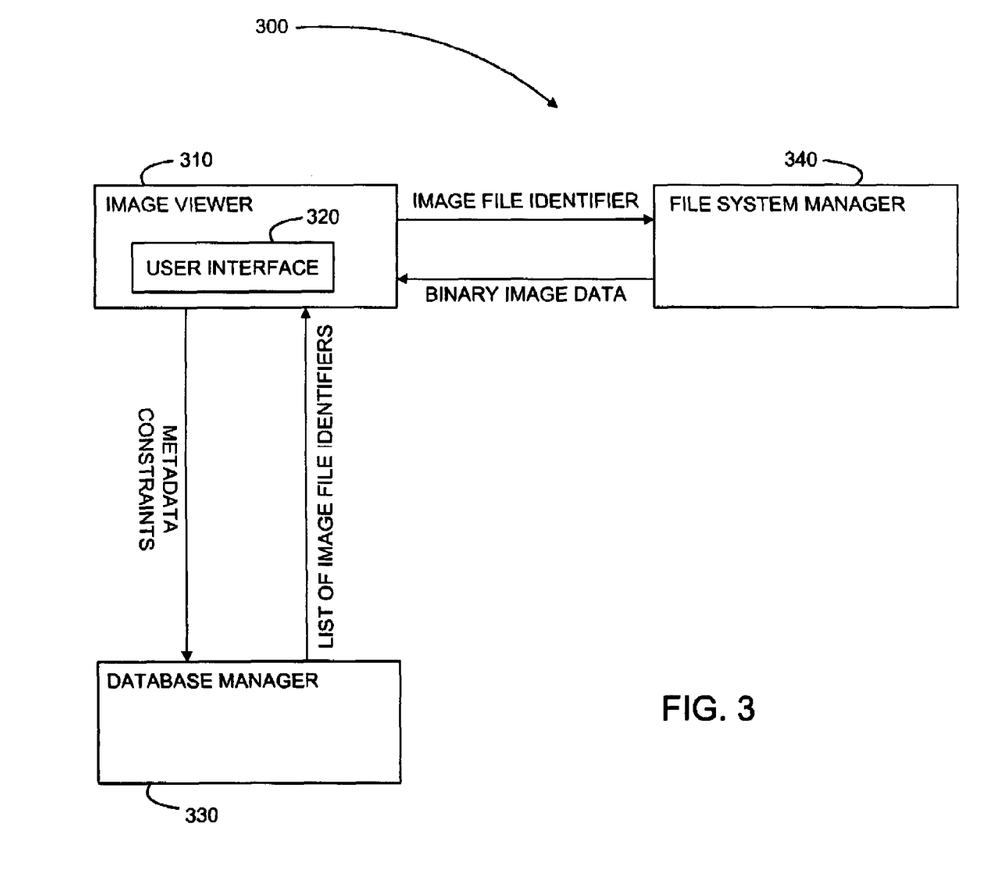
FIG. 3 is a simplified block diagram for an image asset organizer with a plurality of filters, in accordance with a preferred embodiment of the present invention.

Reference is now made to FIG. 3, which is a simplified block diagram for an image asset organizer 300 with a plurality of filters, in accordance with a preferred embodiment of the present invention. Shown in FIG. 3 is an image viewer 310, used to render image pixel data for display by a video graphics processor on a computer monitor. Image viewer 310 includes a user interface 320, such as the user interface illustrated hereinabove in FIGS. 1 and 2, through which a user designates one or more metadata constraints.

Image viewer 310 communicates with a database manager 330, which stores and retrieves metadata from a relational database system. In a preferred embodiment of the present invention, the relational database system includes tables, described hereinbelow, and can be queried to identify images having associated metadata satisfying one or more designated constraints. Specifically, database manager 330 provides image viewer 310 with image file identifiers for such images. In a preferred embodiment of the present invention, database manager 330 also provides thumbnail representations for such images, which are stored within the relational database tables as binary data.

Alternatively, database manager 330 may provide image viewer 310 with one or more statistics about the images satisfying the designated metadata constraints. For example, database manager 330 may indicate the number of images satisfying the designated constraints.

Image viewer 310 also communicates with a file system manager 340, which stores and retrieves file data from a computer file system. Image viewer 310 requests data from files specified by image file identifiers, and file system manager 340 provides the requested data.

Preferably, when a user double clicks on a thumbnail of an image, the full resolution image is displayed. In a preferred embodiment of the present invention, data provided by file system manager 340 includes full resolution pixel data from image files.

Alternatively, the thumbnail representations themselves may be stored within the file system, in which case file system manager 340 provides the thumbnails upon request.

In a preferred embodiment of the present invention, relational database tables are used to catalog assets by storing metadata associated with image files and other types of assets, and retrieving image thumbnails and asset locations.

Some types of metadata, such as category and folder, are organized hierarchically. For example, in accordance with a preferred embodiment of the present invention, a category for a digital asset may have zero, one or more sub-categories. The present invention preferably uses a special database representation of tree data structures, for efficient implementation of tree operations within a relational database environment.

Figure 4:
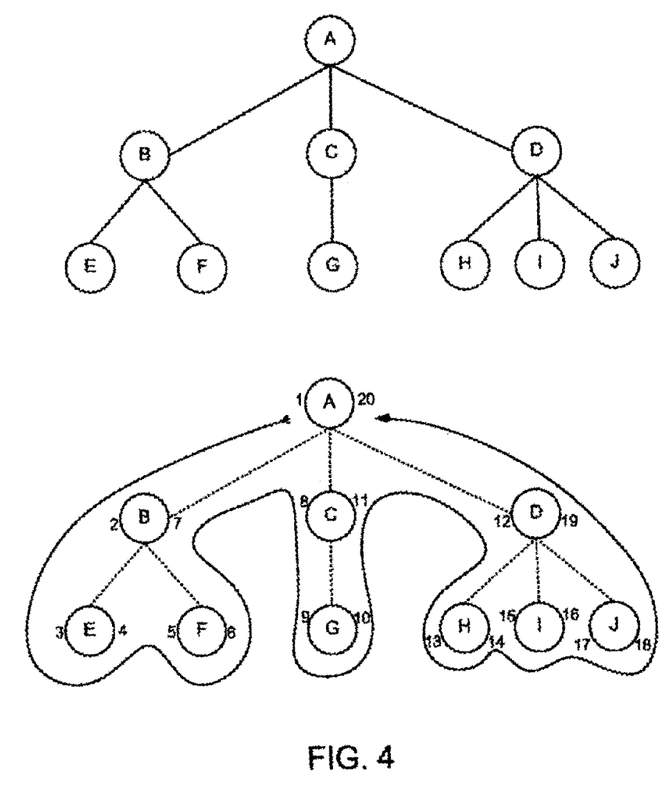
FIG. 4 is a simplified illustration of a tree data structure and its representation within a database table, in accordance with a preferred embodiment of the present invention.

Reference is now made to FIG. 4, which is a simplified illustration of a tree data structure and its representation within a database table, in accordance with a preferred embodiment of the present invention. Shown in FIG. 4 is a tree hierarchy including ten nodes, labeled A-J, each node corresponding to a specific category, such as a category illustrated in pane 130 of FIG. 1A. The nodes of the tree are traversed in a pre-order traversal, and each node is assigned two numbers; a left-walk value for the stage of the traversal as the node is first encountered going down the tree, and a right-walk value for the stage of the traversal as the node is last encountered going up the tree. For example, the pre-order traversal for the tree in FIG. 4 is as follows:

| | |
|---|---|
| Down: | A(1) → B(2) → E(3) |
| Up: | E(4) → B |
| Down: | B → F(5) |
| Up: | F(6) → B(7) → A |
| Down: | A → C(8) → G(9) |
| Up: | G(10) → C(11) → A |
| Down: | A → D(12) → H(13) |
| Up: | H(14) → D |
| Down: | D → I(15) |
| Up: | I(16) → D |
| Down: | D → J(17) |
| Up: | J(18) → D(19) → A(20) |

Accordingly, the table records for this tree are as shown below.

| | | |
|---|---|---|
| A | 1 | 20 |
| B | 2 | 7 |
| C | 8 | 11 |
| D | 12 | 19 |
| E | 3 | 4 |
| F | 5 | 6 |
| G | 9 | 10 |
| H | 13 | 14 |
| I | 15 | 16 |
| J | 17 | 18 |

Specifically, a Category Table is used to store records for a category tree, as follows:

TABLE I

| Category Table | | |
|---|---|---|
| Category ID | Left-Walk | Right-Walk |
| 64-bit ID | Left walk value in category tree | Right walk value in category tree |

The Category ID is preferably a 64-bit integer which serves as a primary key for Table I. It may be appreciated by those skilled in the art that the pre-order traversal of the category tree corresponds to stepping through the left-walk node values in increasing order.

The Category Table may include additional fields relating to categories. For example, a field may be included for the name of a category. Additionally, a category may have (i) attributes associated therewith, in which case a field for attribute data is also included in Table I; (ii) an icon associated therewith, in which case a field for binary icon data is also included in Table I; and (iii) a time stamp associated therewith, in which case a field for a date & time is also included in Table I. Category attributes can be used to indicate that a category is locked. Category time stamps can be used to indicate when data relating to a category was last changed, or when a category's position within the category tree structure was last changed.

It may be appreciated by those skilled in the art that Table I can support multiple category trees, by including a field for a link to a root table.

When representing tree data structures within a relational database, it is important that the database management system support tree-based operations. In a preferred embodiment of the present invention, the following six database methods are provided, in order to efficiently perform tree operations within Table I.

1. GetTree(DWORD dwID)

Preferably, GetTree( ) returns the category sub-tree rooted at the category with ID dwID, as a list of records sorted according to a pre-order traversal of the sub-tree. Such a list is generated by retrieving those records of Table I with left-walk values greater than the dwID left-walk value, and less than the dwID right-walk value. The retrieved records are sorted by increasing left-walk values to obtain the desired pre-order for the nodes of the tree.

2. GetPath (DWORD dwID)

Preferably, GetPath( ) returns the path of categories from the root category to the category with ID dwID, in depth order from root to the specified category. Such a path is generated by retrieving those records of Table I with left-walk values less than the dwID left-walk value, and right-walk values greater than the dwID left-walk value, and sorting them according to increasing left-walk value.

3. AddTree (DWORD dwParent, DWORD dwLeftSibling, RecordList*pSubTree)

Preferably, AddTree( ) accepts a list of records, pSubTree, representing a tree sorted in pre-order traversal, and adds it to the existing category tree as a sub-tree of the parent node dwParent and to the right of the left sibling node dwLeftSibling. If pSubTree is to be added as the left-most sub-tree of dwParent, then the dwLeftSibling parameter is set to null. The record list provided is a pre-order traversal of the tree to be added, normalized so that its root node has a left-walk value of one, and a right-walk value equal to twice the number of nodes in the tree to be added.

The first step in adding the tree is to re-number the existing category tree records so that there is "room" for adding pSubTree. This is performed by adding the right-walk value of the root node of pSubTree to both the left-walk and the right-walk values of those records with (i) left-walk value greater than the right-walk value of dwLeftSibling, if dwLeftSibling is not null; or (ii) left-walk value greater than the left-walk value of dwParent, if dwLeftSibling is null. In addition, the right-walk value of the root node of pSubTree is also added to the right-walk value of dwParent.

The second step is to (i) add the right-walk value of dwLeftSibling to both the left-walk and the right-walk values of each node in pSubTree, if dwLeftSibling is not null; or (ii) add the left-walk value of dwParent to both the left-walk and the right-walk values of each node in pSub-Tree, if dwLeftSibling is null.

The third step is to add records for the nodes of pSubTree, as adjusted in the second step above, into Table I.

4. DeleteTree(DWORD dwID)

Preferably, DeleteTree( ) removes the records of all nodes in the sub-tree rooted at dwID.

The first step in deleting the sub-tree is to delete all records with left-walk values greater than or equal to the left-walk value of dwID, and with right-walk values less than or equal to the right-walk values of dwID. The number of records deleted is equal to the integral part of half of the difference between the right-walk and left-walk values of dwID.

The second step is to update Table I by subtracting twice the number of records deleted, from both the left-walk values and the right-walk values of each node having a right-walk value greater than the left-walk value of the parent node of dwID.

The third step is to subtract twice the number of records deleted from the right-walk value of the parent node of dwID.

5. MoveTree(DWORD dwID, DWORD dwParent, DWORD dwLeftSibling)

Preferably, MoveTree( ) moves the sub-tree with root dwID to the right of dwLeftSibling under dwParent. As with AddTree( ), if the sub-tree is to be added as the left-most sub-tree of dwparent, then the dwLeftSibling parameter is set to null.

The first step in moving the sub-tree is to call GetTree (dwID).

The second step is to subtract twice the number of nodes being moved from both the left-walk and right-walk values of each node in the record list returned by GetTree( ).

The third step is to call DeleteTree(dwID).

The fourth step is to call AddTree(dwparent, dwLeftSibling, pMoveTree), where pMoveTree is the record list returned by GetTree( ), adjusted as in the second step above.

6. GetChildren (DWORD dwID, int nDepth)

Preferably, GetChildren( ) returns the descendent nodes of dwID up to depth nDepth, as a list of records sorted according to a pre-order traversal of the descendent nodes. Such a list is generated by looping though each of the children of dwID, starting with the left-most child and ending with the right-most child. For each such child, say ChildN, the record for ChildN is added to the record list, and GetChildren (dwChildN, nDepth-1) is called recursively. The records returned by GetChildren( ) are appended to the record list to be returned. When GetChildren( ) is called with a depth of zero, it returns an empty record list.

In a preferred embodiment of the present invention, folder structure, also being hierarchical in nature, is stored using the same representation as with categories. Specifically, the following table is used for storing a folder tree:

TABLE II

Folder Table

| Folder ID | Left-Walk | Right-Walk |
|---|---|---|
| 64-bit ID | Left-walk value in category tree | Right-walk value in category tree |

The Folder ID is preferably a 64-bit integer which serves as a primary key for Table II. By use of the GetPath( ) method above, the full path of a folder is recoverable from its Folder ID.

It may be appreciated by those skilled in the art that Table II can support multiple folder trees, by including a field for a link to a root table. Multiple folder trees may correspond to multiple local drives, network drives, offline drives and photodisc drives.

The Folder Table may include additional fields relating to folders. For example, a field may be included for the name of a folder. Additionally, a folder may have (i) attributes associated therewith, in which case a field for attribute data is also included in Table II; and (ii) a time stamp associated therewith, in which case a field for a date & time is also included in Table II. Folder attributes can be used to indicate that a folder is excluded from a digital asset catalog, and to indicate the type of a folder, such as standard or compressed.

A catalog of digital assets, including image files, audio files, video files, and other types of assets such as documents and folders, is preferably stored in the relational database as follows:

TABLE III

Asset Table

| Asset ID | Time Stamp | Folder ID |
|---|---|---|
| 64-bit ID | Date & time | Foreign key to Folder Table |

The Asset ID is preferably a 64-bit integer which serves as a primary key for Table III.

The Asset Table may include additional fields relating to assets. For example, a field may be included for the name of an asset, and for the type of an asset such as "image", "movie", "audio", "slide show", "album", and even "folder"—which is also a type of asset. Additionally, an asset may have (i) a cyclic redundancy check (CRC) for determining whether the asset was changed, in which case a field for a CRC is also included in Table III; (ii) a file type for indicating the file type of an asset, in which case a field for a file type is also included in Table III; and (iii) backup information, in which case one or more fields for backup location and date & time are also included in Table III. It may be appreciated by those skilled in the art that multiple date & time stamps may be included in Table III; for example, a file last modified date & time, and an EXIF header date & time, and a manually entered date & time.

Thumbnail pixel data for assets may be stored within the relational database, or alternatively within the file system. In the former case, preferably a table is used to retrieve thumbnail data based on Asset ID, as follows:

TABLE IV

Thumbnail Table

| Asset ID | Resolution | Thumbnail |
|---|---|---|
| 64-bit ID | Pixel resolution of thumbnail | Binary thumbnail data as BLOB |

An asset may have multiple thumbnails associated therewith, each thumbnail having a different resolution. Thus the pair of fields Asset ID and Resolution form a composite key for Table IV. The field for resolution may be stored as two fields; namely, a field for the width in pixels of the thumbnail, and a field for the height in pixels of the thumbnail.

The Thumbnail Table may include additional fields relating to thumbnails. For example, a thumbnail may have (i) a cyclic redundancy check (CRC) for determining whether the thumbnail was changed, in which case a field for a CRC is also included in Table IV; (ii) attributes associated therewith, in which case a field for attribute data is also included in Table IV; and (iii) a time stamp associated therewith, in which case a field for a date & time is also included in Table IV. Attributes for a thumbnail can include image format information, such as number of color channels and color depth. More generally, image format attributes may be specified in a record of a Thumbnail Definition table, in which case Table IV includes a foreign key to the Thumbnail Definition Table.

Additionally, thumbnails may be assigned unique IDs, in which case a field for Thumbnail ID would serve as a primary key for Table IV.

Preferably, in order to associate assets and categories, a table to join assets and categories is populated as follows:

TABLE V

Asset - Category Relationship

| Asset ID | Category Path ID |
|---|---|
| 64-bit ID | 64-bit ID |

Each record in Table V preferably designates that a specific asset belongs to a specific category. It is noted, as mentioned hereinabove, that categories are arranged hierarchically. In the present invention, assets may have multiple categories associated therewith. As such, an Asset ID may have multiple Category IDs associated therewith. Similarly, a Category ID may have multiple Asset IDs associated therewith.

In a preferred embodiment of the present invention, database manager 330 listens for events from file system manager 340. Specifically, if a user moves a file to a different folder, or changes the name of the file, then database manager 330 receives an event notification and is able to dynamically update TABLE III accordingly. Similarly, if a user moves folders around within his file system, then database manager 330 receives an event notification and is able to dynamically update TABLES II and III accordingly. This mechanism ensures that TABLES II and III are synchronized with the file system.

Preferably, in order to generate unique ID's for assets, categories, folders and thumbnails, a table of latest used ID's is maintained, and a next ID is generated by adding 1 to the current ID. Specifically, the following TABLE VI maintains current ID information.

TABLE VI

Unique ID generation

| Name | Current ID |
|---|---|
| ASSET ID (KEY = "1") | 64-bit integer |
| CATEGORY ID (KEY = "2") | 64-bit integer |
| FOLDER ID (KEY = "3") | 64-bit integer |
| THUMBNAIL ID (KEY = "4") | 64-bit integer |

Preferably, whenever a next ID is assigned TABLE VI is updated accordingly.

It will be apparent to those skilled in the art that there are several ways to populate the above tables. For example, a client application may initially scan specific folders in a user's hard disk, such as a default \My Pictures folder, for images and their metadata. The user may scan additional folders by initiating a search for images. When the client application acquires new images by importing from a scanner or uploading from a digital camera, it may scan their metadata and enter them within the database at the time of acquisition. Since identification of image files and scanning their metadata are simple operations, a large archive of images can be scanned within minutes. Preferably, the database is persistent, and does not have to be reloaded again after the application is closed.

Figure 5:
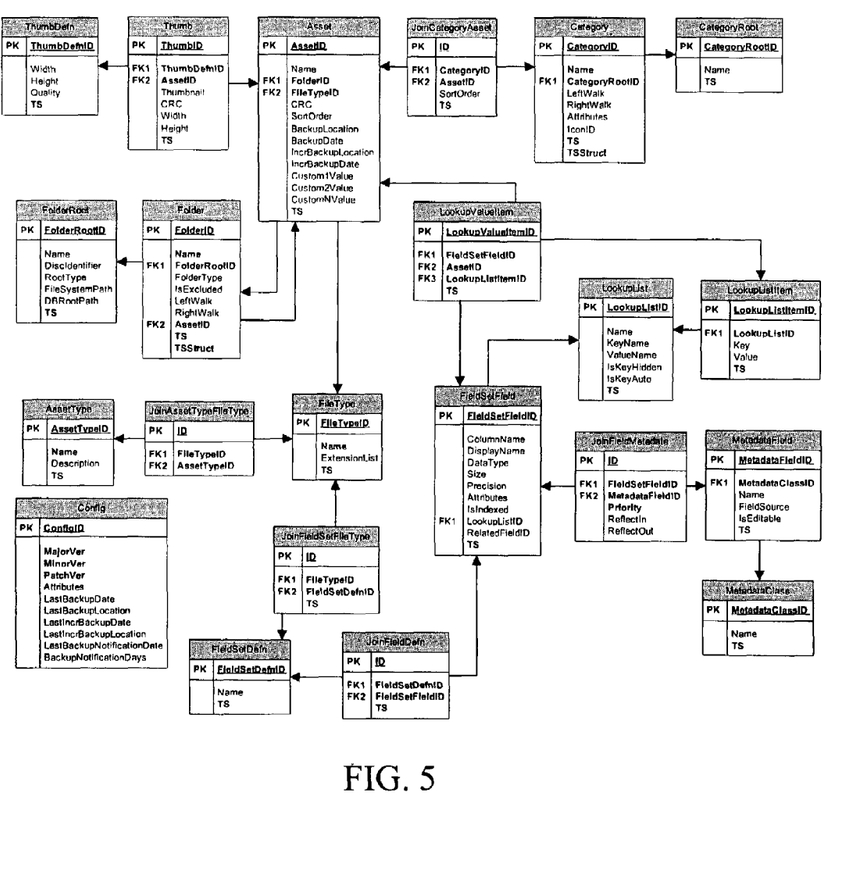
FIG. 5 is system of inter-related database tables, for implementing a preferred embodiment of the present invention.

Reference is now made to FIG. 5, which is a more extensive system of inter-related database tables, including tables for defining custom fields for assets, tables for metadata and tables for look-up lists, as described hereinbelow, for implementing a preferred embodiment of the present invention. Arrows between tables in FIG. 5 indicate foreign keys linking fields of one table to records of another table. Fields with "ID" in their names are primary or foreign keys.

Tables without "Join" in their names define structures for various types of data, including inter alia assets, categories, folders and thumbnails. Tables with "Join" in their names define relationships between these structures, including inter alia the asset-category relationship and the asset type-file type relationship.

In the extended database shown in FIG. 5, fields for assets are preferably grouped into "field sets". The table named "FieldSetDefn" includes records for field sets, and the table named "FieldSetField" includes records for each field. Each field set in the FieldSetDefn table and each field in the FieldSetField table has a unique ID associated therewith. The "ColumnName" in the FieldSetField table denotes the name of a field as used within the Asset table; and the "DisplayName" denotes the name of the field as displayed to a user. The table named "JoinFieldDefn" defines the relationship of which fields belong to which field sets. In a preferred embodiment of the present invention, a field may belong to more than one field set, provided that a consistent value is assigned to the field.

Similar to the field sets, tables are also provided for metadata classes. The table named "MetadataClass" includes records for classes of metadata; i.e., groups of metadata items, such as the EXIF and IPTC metadata classes. The table named "MetadataField" includes records for each particular metadata item. The table named "JoinFieldMetadata" relates the metadata items in the MetadataField table to the fields in the FieldSetField table, indicating metadata definitions for fields.

Also shown in FIG. 5 are tables for look-up lists. The table named "LookupList" includes records for look-up lists, which can be used as enumerations for fields. For example, the standard EXIF Flash value is a number between 0 and 9, each number corresponding to a setting such as "no flash", "autoflash" and "red-eyeflash". The table named "LookupListItem" includes records for the individual items within the look-up lists. Since each item resides within only one list, there is no need for a join table to relate list items with lists. However, a table named "LookupValueItem" is used to relate look-up list items to the fields that use them as enumerations therefor; i.e., a record of the LookupValueItem table is used to designate that a specific field of a specific asset is assigned a specific enumerated value. Preferably, the LookupValueItem table is used in lieu of including enumerated fields as columns in the Asset table.

In a preferred embodiment of the present invention, extended queries are supported by a method GetAssetList(FolderIDSearchList listFolderIDs, CategoryIDSearchList listCategoryIDs, DateRangeSearchList listDateRanges, QueryPhraseSearchList listQueryPhrases)

Preferably, GetAssetList( ) accepts a list of Folder IDs to search, a list of Category IDs to search, a list of date & time ranges to search, and a list of query phrases; and generates a list of asset records that satisfy the search criteria. A query phrase preferably includes a field, an operator and one or more values to compare the field with. One or more of the lists of Folder IDs, Category IDs, date & time ranges and query phrases may be empty. It may be appreciated by those skilled in the art that GetAssetList( ) may include additional input parameters, such as (i) one or more file search masks, which enable searches for file name patterns such as "*.jpg" or "*.avi" extensions; and (ii) one or more search flags, such as a flag for including sub-folders or sub-categories, and a flag for matching any category.

Figure 6:
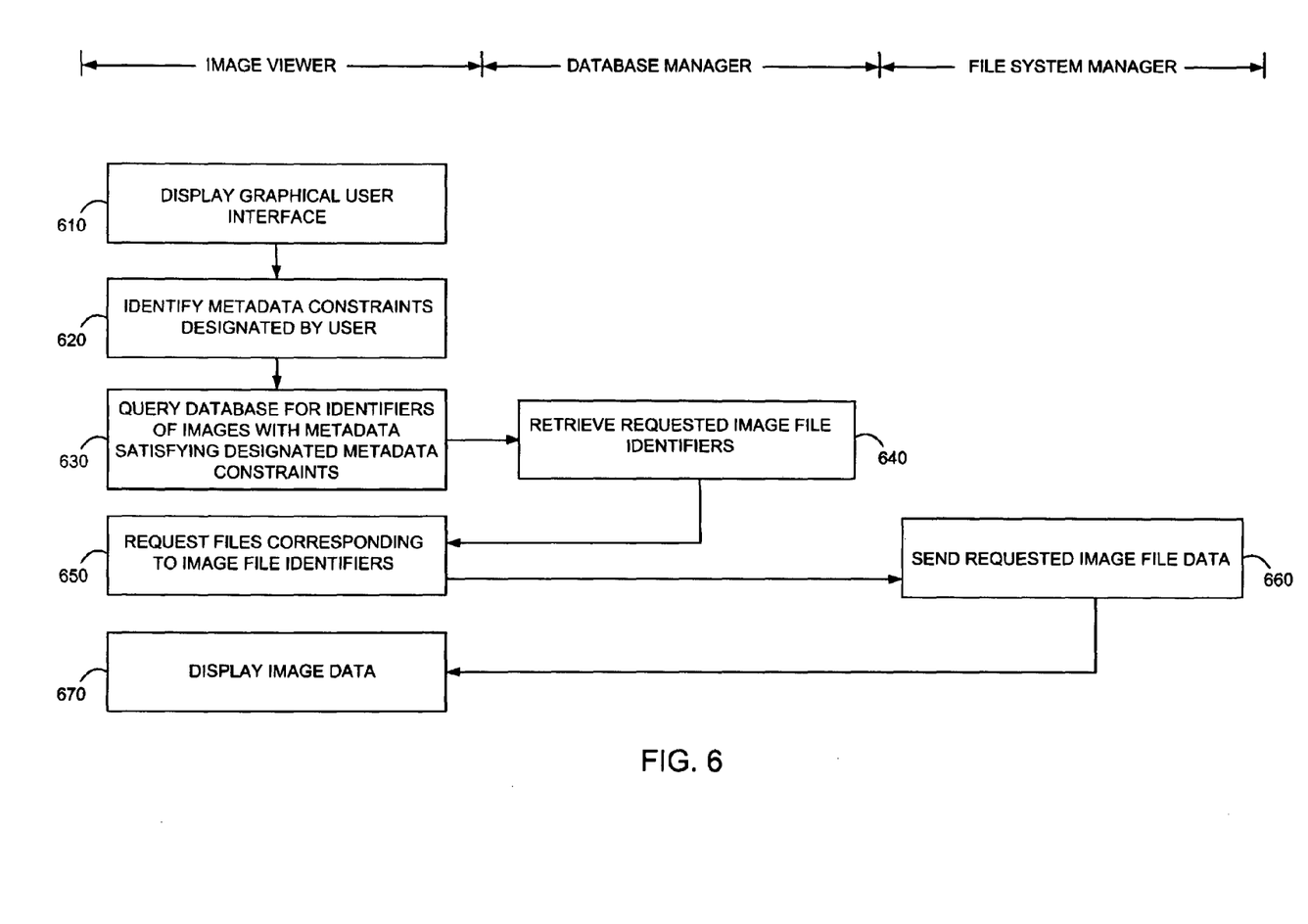
FIG. 6 is a simplified flowchart for retrieving image assets, in accordance with a preferred embodiment of the present invention.

Reference is now made to FIG. 6, which is a simplified flowchart for retrieving image assets, in accordance with a preferred embodiment of the present invention. FIG. 6 is divided into three columns. The leftmost column indicates steps performed by an image viewer, such as image viewer 310 (FIG. 3). The middle column indicates steps performed by a database manager, such as database manager 330. The rightmost column indicates steps performed by a file system manager, such as file system manager 340.

At step 610 the image viewer displays a graphical user interface, such as the user interface illustrated hereinabove in FIGS. 1 and 2. At step 620 the image viewer identifies one or more metadata constraints designated by a user via the user interface. At step 630 the image viewer queries the database manager for information regarding images whose metadata satisfies the designated metadata constraints.

At step 640 the database manager performs the database query, retrieves image file identifiers for the requested images and sends the identifiers back to the image viewer. In a preferred embodiment of the present invention, the database manager also sends thumbnail representations of the requested images. At step 650 the image viewer requests file data from the file system manager, for files identified by the image file identifiers. The file data may include full resolution image pixel data. If thumbnail representations are not delivered by the database manager, then the file data may also include the thumbnails.

At step 660 the file system manager retrieves the requested image file data and sends the data back to the image viewer. Finally, at step 670 the image viewer uses the image file data to display appropriate image data within the user interface.

The present invention has many diverse applications. It is apparent to those skilled in the art that the present invention is not limited to digital image organization, and may be applied to organization of other digital content. For example, the present invention may be used to organize animations, slide presentations, digital video content, electronic documents and e-mail, and a combination of such types of digital content. Similarly, the present invention may be used to organize albums of images instead of individual images, where the date associated with an album is, for example, the date of the earliest image in the album. Instead of displaying thumbnails for individual images in FIGS. 1 and 2, the user interface may display thumbnails for albums.

In reading the above description, persons skilled in the art will realize that there are many apparent variations that can be applied to the methods and systems described. One such variation is embodiment within a client-server environment, instead of a local environment. Thus, with respect to FIG. 3, database manager 330 and file system manager 340 may reside on server computers, networked together with a client computer that runs image viewer 310.

Database 330 preferably has a lock mechanism that prevents multiple clients from updating the database simultaneously. For example, a single lock byte (0 or 1) can be used for global locking. When the database is opened, a "1" is written to the lock byte, and when the database is closed a "0" is written to the lock byte. An advantage of global locking is that the database manager can detect whether the database was closed properly the last time it was used. If the lock byte is set to "1" before the database is opened, then it was not closed properly, and is accordingly repaired. It may be appreciated by those skilled in the art that other locking mechanisms may be employed, as are commonly used by database servers.

A client-server network embodiment of the present invention has wide applicability to thin client devices that do not have the capability of storing large image archives. Specifically, the present invention provides powerful image asset organization for wireless devices such as wireless PDA's and cell phones.

A client-server network embodiment of the present invention also has applicability to home networks, for organizing diverse types of multi-media content for home entertainment.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer readable storage medium containing instructions which when executed implement a system for retrieval of digital assets having metadata associated therewith, the medium comprising:
    instructions for an interface (i) for generating a plurality of metadata constraints, wherein each metadata constraint sets at least one value for a metadata property, (ii) for modifying property values associated with the generated metadata constraints, (iii) for selectively activating or de-activating the generated metadata constraints by means of activation controls, wherein each metadata constraint can be independently activated or de-activated without affecting the activation status and settings of the other metadata constraints and (iv) for selectively locking or unlocking the generated metadata constraints by means of lock controls, wherein each constraint can be independently locked or unlocked without affecting the lock status and settings of other metadata constraints;
    instructions for a query processor for applying the activated metadata constraints in accordance with their respective property values;
    instructions for a display interface for viewing a result of said query processor;
    instructions for an activation processor (v) for activating a metadata constraint when a property value associated within the metadata constraint is modified, and (vi) for re-applying the activated metadata constraints within the query processor whenever the interface changes an activation status of a metadata constraint and whenever the interface changes the property value of a metadata constraint; and
    instructions for a constraint lock processor (vii) for causing unlocked and activated metadata constraints to become de-activated when other metadata constraints are activated, or when other metadata constraint property values are modified, and (viii) for causing locked and activated metadata constraints to remain activated when other metadata constraints are activated, or when other metadata constraint property values are modified.

2. The medium of claim 1 wherein metadata includes file system data.

3. The medium of claim 1 wherein metadata includes data assigned by a capture device.

4. The medium of claim 1 wherein metadata includes user assigned data.

5. The medium of claim 1 wherein the plurality of metadata constraints include at least one constraint on date and time metadata.

6. The medium of claim 1 wherein the plurality of metadata constraints include at least one constraint on category metadata.

7. The medium of claim 1 wherein the plurality of metadata constraints include at least one constraint on property metadata.

8. The medium of claim 1 wherein said interface is used for saving a group of at least one metadata constraint as a filter.

9. A method for retrieving digital assets having metadata associated therewith, comprising:
    generating a plurality of metadata constraints, wherein each metadata constraint sets one or more values for a metadata property;
    selectively activating or de-activating the generated metadata constraints by means of activation controls, wherein each metadata constraint can be independently activated or de-activated without affecting the activation status and settings of the other metadata constraints;
    modifying at least one property value associated with at least one generated metadata constraint;
    selectively locking or unlocking the generated metadata constraints by means of lock controls, wherein each metadata constraint can be independently locked or unlocked without affecting the lock status and settings of the other metadata constraints;
    activating a metadata constraint when a property value associated within the metadata constraint is modified;
    causing unlocked and activated metadata constraints to become de-activated when other metadata constraints are activated, and when other metadata constraint property values are modified;
    causing locked and activated metadata constraints to remain activated when other metadata constraints are activated, and when other metadata constraint property values are modified:
    applying the activated metadata constraints in accordance with their respective property values;
    viewing a result of said applying; and
    re-applying the activated metadata constraints whenever said selectively activating changes an activation status of a metadata constraint and whenever said modifying modifies a property value of a metadata constraint.

10. The method of claim 9 wherein metadata includes file system data.

11. The method of claim 9 wherein metadata includes data assigned by a capture device.

12. The method of claim 9 wherein metadata includes user assigned data.

13. The method of claim 9 wherein the plurality of metadata constraints include at least one constraint on date and time metadata.

14. The method of claim 9 wherein the plurality of metadata constraints include at least one constraint on category metadata.

15. The method of claim 9 further comprising saving a group of at least one metadata constraint as a filter.

* * * * *